United States Patent [19]

Stack

[11] Patent Number: 5,181,242

[45] Date of Patent: Jan. 19, 1993

[54] QUICK RELEASE LATCH MECHANISM FOR A TELEPHONE HANDSET

[75] Inventor: Larry D. Stack, Colfax, N.C.

[73] Assignee: AT&T Bell Laboratories, Murray Hill, N.J.

[21] Appl. No.: 607,018

[22] Filed: Oct. 31, 1990

[51] Int. Cl.⁵ .............................................. H04M 1/00
[52] U.S. Cl. .................................. 379/445; 379/449; 379/437; 70/DIG. 72
[58] Field of Search ............... 379/445, 447, 450, 451, 379/435, 436, 437, 428, 434, 440, 449, 455, 457, 144, 155; 70/DIG. 72

[56] References Cited

U.S. PATENT DOCUMENTS

| | | | |
|---|---|---|---|
| 1,883,549 | 10/1932 | Carr | 379/445 |
| 2,494,449 | 1/1950 | Obergfell | 379/449 |
| 3,301,969 | 1/1967 | Darling et al. | 379/445 |
| 3,469,041 | 9/1969 | Winston | 379/445 |
| 4,117,276 | 9/1978 | Zurawski | 379/437 |
| 4,153,823 | 5/1979 | Hanson | 379/445 |
| 4,965,824 | 10/1990 | Hollowed et al. | 379/144 |

FOREIGN PATENT DOCUMENTS

| | | | |
|---|---|---|---|
| 0030241 | 2/1983 | Japan | 455/89 |
| 1338107 | 9/1987 | U.S.S.R. | 379/437 |

Primary Examiner—James L. Dwyer
Assistant Examiner—Jason Chan
Attorney, Agent, or Firm—Samuel R. Williamson

[57] ABSTRACT

A quick release latching mechanism is provided for restraining a handset of a telephone set. Easily adaptable to fit most existing telephone sets with minimal modifications, the latching mechanism is also easily manufactured, yet satisfies existing safety requirements by being able to restrain the handset during harsh operating conditions. The handset is securely restrained in the handset cradle of a telephone set base by a floating toggle type latch which is balanced around its pivot point and is the only moving part in the quick release latching mechanism. A coil spring is provided to return this latch to its closed position. Any shock forces encountered by the latch are not absorbed or counterbalanced by the spring force since these shock forces are applied in a direction normal to the force exerted by the spring. The spring force, therefore, does not secure the latch in the closed position. Rathr it simply serves to return the latch to this position when the latch is permitted to move freely. The latching mechanism is not only of simplified and reliable construction, but also permits easy insertion and removal of the telephone handset.

25 Claims, 8 Drawing Sheets

QUICK RELEASE LATCH MECHANISM FOR A TELEPHONE HANDSET

BACKGROUND OF THE INVENTION

1. Technical Field

This invention relates to telephone handset restraining devices and, more particularly, to a quick release latching mechanism for restraining a handset in an accommodating cradle.

2. Description of the Prior Art

In certain communication environments today, there is a need for communication devices such as telephone sets to be ruggedized in their ability to withstand certain harsh operating conditions. A need to secure these devices from unauthorized users is also of concern in certain of these environments.

In both military and commercial operations, harsh operating conditions are often present that require the ruggedized telephone sets. Such operating conditions regularly occur on board aircraft and maritime vessels. To guard against these telephone sets becoming safety hazards during such operating conditions, certain design requirements are imposed upon their manufacturers. On certain navy vessels, for example, there is a requirement that telephone sets employed thereon be designed such that no part may be propelled from these sets and possibly cause injury to personnel or equipment in the immediate area. Thus in the design of these sets, consideration is given to preventing any part of the telephone set from becoming a projectile as a result of the application of a shock blow.

Unless restrained in some manner, one part that easily may be propelled from the telephone set is an associated handset when it is nested in an accommodating cradle of the telephone base. One known system restrains the handset in the telephone base by employing a latch mechanism built into the yoke portion of the handset. The latch mechanism restrains the handset by engaging the top of an upstanding pin which is attached to the telephone base. This pin protrudes outward from the telephone base and is engaged by the latch mechanism when the handset is cradled. A release button is provided on the side of the handset for disengaging the latch mechanism from the pin. Although this system restrains the handset, it unfortunately requires a specially modified telephone set which is costly as an initial purchase item and as a replacement item.

Another known system restrains the handset in the telephone base by employing apparatus in the cradle of the telephone base for securing the handset. In one specific embodiment employing this system, the handset is secured through such apparatus adapted for restraining both the transmitter portion and the receiver portion of the handset when the handset is placed in the cradle of the telephone base. The transmitter portion is secured in a portion of the cradle having a specially contoured cavity which accommodates the shape of the transmitter portion of the handset with a very close tolerance. The receiver portion of the handset is secured by a finger-like metal bracket which extends outward from the telephone base and around the outer edge of the receiver portion of the handset.

Securing of the handset in this system is achieved by a complex handset locking arrangement. As a user inserts the handset in the cradle of the telephone base, he or she presses the transmitter portion downward into the contoured cavity of the cradle. A latching mechanism in the telephone base is tripped by the depression of an upstanding tab in the cavity of the cradle and, in response thereto, the finger-like metal bracket moves toward and contacts the outer surface of the receiver portion of the handset. The force of this metal bracket pressing the handset into the cradle provides the required restraint for the handset.

A latch release mechanism is provided in the telephone set for releasing the finger-like metal bracket. This mechanism is actuated by a user depressing a handset-release button on the telephone base. When the release mechanism is actuated, the metal bracket moves away from the receiver portion of the handset and thereby permits removal of the handset from the telephone base. Although no specially modified handset is required, as in the earlier described system, telephone bases employing this system have been noted as awkward and difficult to use. Indeed, it is not obvious to the casual observer just how to insert or remove the handset. This telephone set is also quite costly as an initial purchase item as well as a replacement item. This is understandable in view of the several moving parts in the telephone base including springs to move the metal bracket to the locked position, and latches to hold it in the locked position. The telephone base also requires a specially contoured cradle for holding the handset in place.

SUMMARY OF THE INVENTION

The invention is directed to solving these and other disadvantages of the prior art. In accordance with the invention, there is provided a low cost quick release latching mechanism for restraining a handset of a telephone set. In restraining the handset, the latching mechanism in preferred embodiments attaches to an enclosure which is easily adaptable to fit most existing telephone set bases with minimal modifications. The latching mechanism is user friendly in that it permits easy insertion and removal of the telephone handset from the telephone base. The latching mechanism is also easily manufactured, yet satisfies existing safety requirements by being able to restrain a telephone handset during harsh operating conditions.

In one aspect of the invention, a latching mechanism for restraining the telephone handset in a handset cradle is provided. The latching mechanism comprises a floating toggle type latch member having a support surface for positioning in contact with the telephone handset and a support member for the latch member. The support member and the latch member are spatially aligned and connected at a single point for permitting rotation of the latch member. A spring member is also connected to both the latch member and the support member for rotating the latch member to a closed position wherein the support surface of the latch member is positioned in contact with the telephone handset and the handset restrained in the handset cradle.

In another aspect of the invention, a locking arrangement for the latch mechanism is provided. This locking arrangement advantageously enables the handset to be locked in the handset cradle thereby preventing theft or unauthorized use of the telephone set when unattended. For preventing theft of the telephone set, the enclosure may be securely fastened to a desk or wall.

BRIEF DESCRIPTION OF THE DRAWING

This invention and its mode of operation will be more clearly understood from the following detailed description when read with the appended drawing in which.

Throughout the drawing, the same element when shown in more than one FIG. is designated by the same reference numeral.

DETAILED DESCRIPTION

Figure 1:
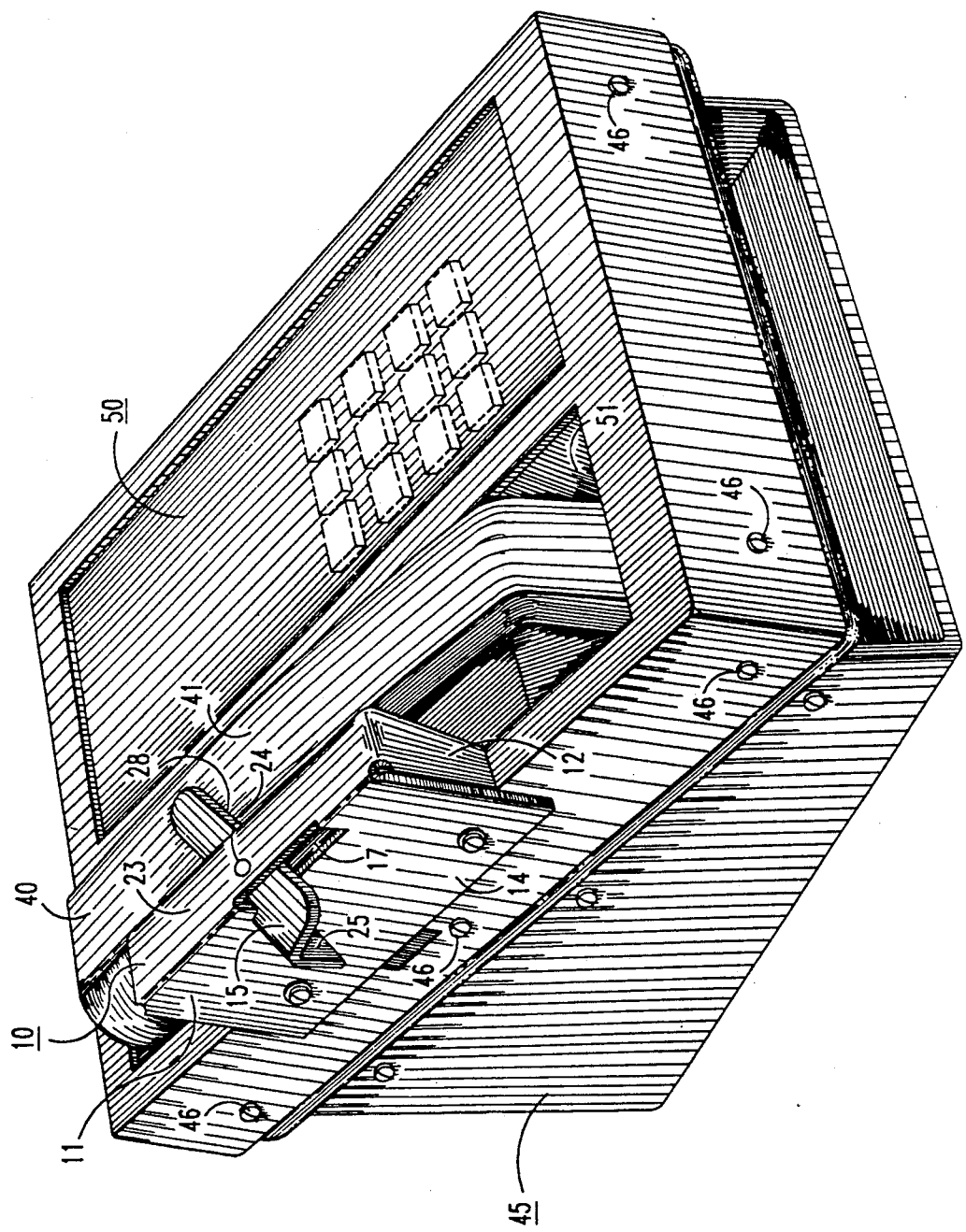
FIG. 1 shows a perspective view of a telephone base inserted in an enclosure and a handset being restrained in the telephone base by a quick release latching mechanism attached to the enclosure in accordance with the invention.
Figure 2:
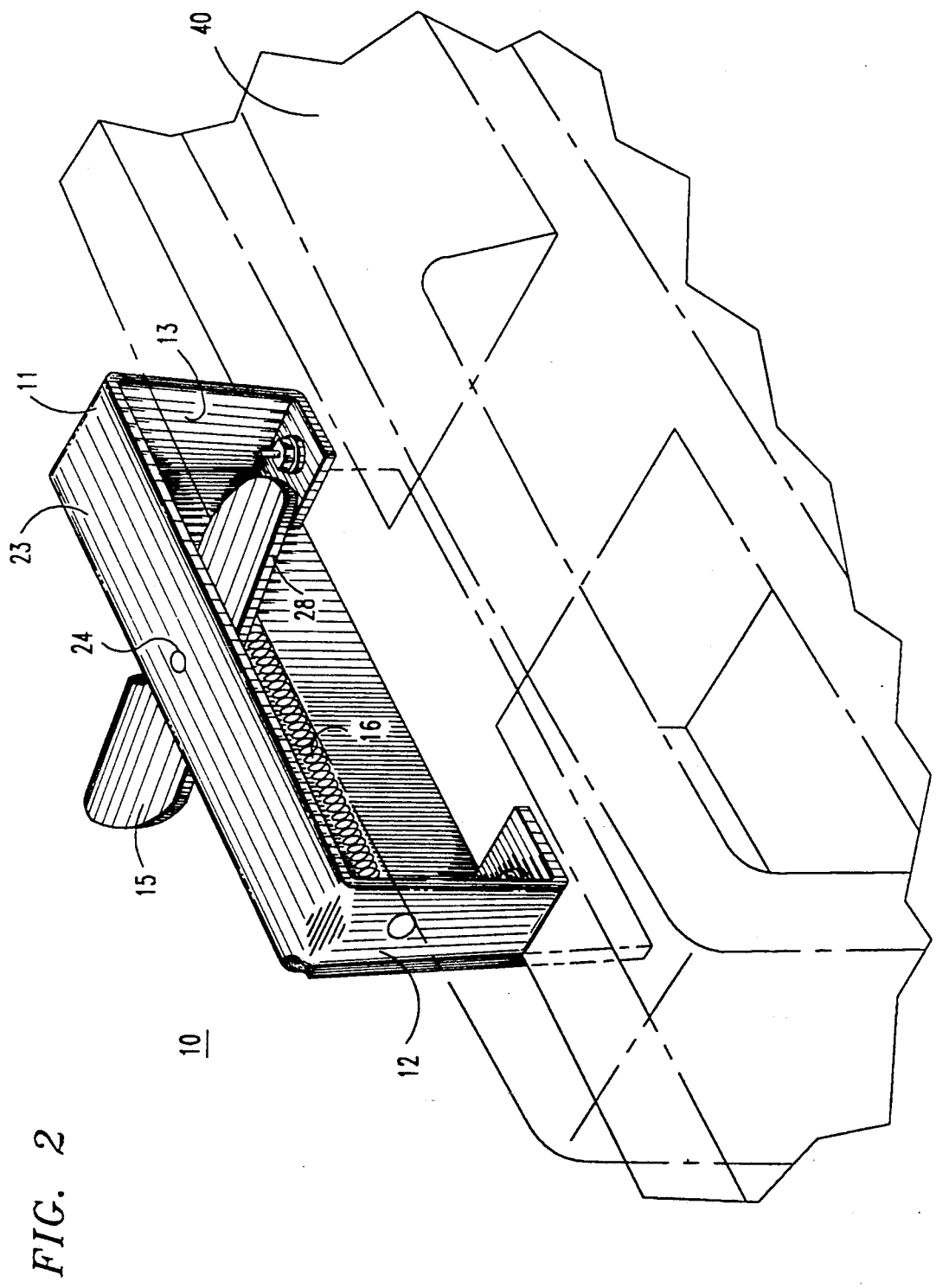
FIG. 2 shows an enlarged fragmentary perspective view of the quick release latching mechanism depicted in FIG. 1 in accordance with the invention.
Figure 3:
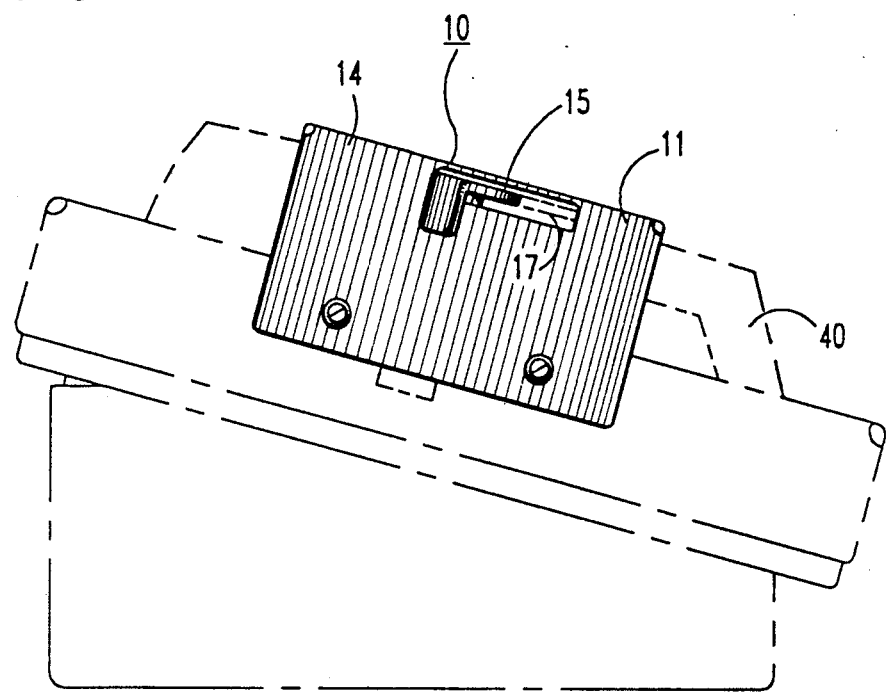
FIG. 3 shows a left side elevation view of the quick release latching mechanism attached to the enclosure and restraining the handset in accordance with the invention.
Figure 4:
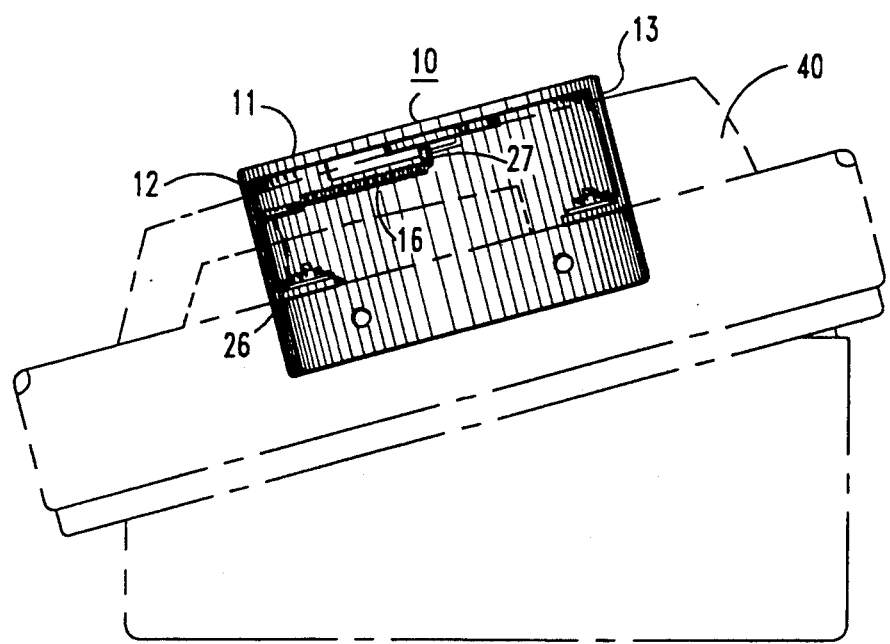
FIG. 4 shows a right side elevation view of the quick release latching mechanism attached to the enclosure and restraining the handset in accordance with the invention.
Figure 5:
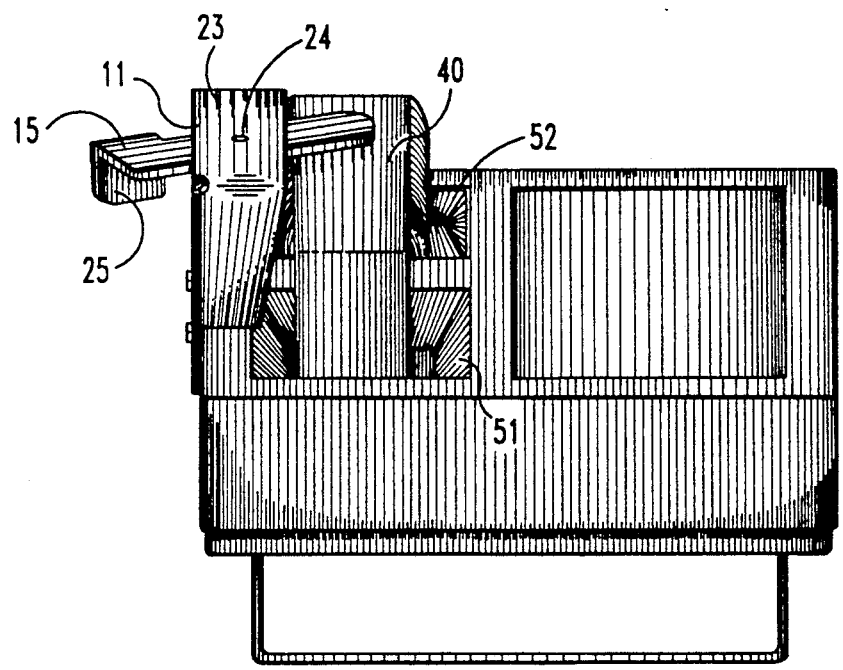
FIG. 5 shows a front elevation view of the quick release latching mechanism attached to the enclosure and restraining the handset in accordance with the invention.
Figure 6:
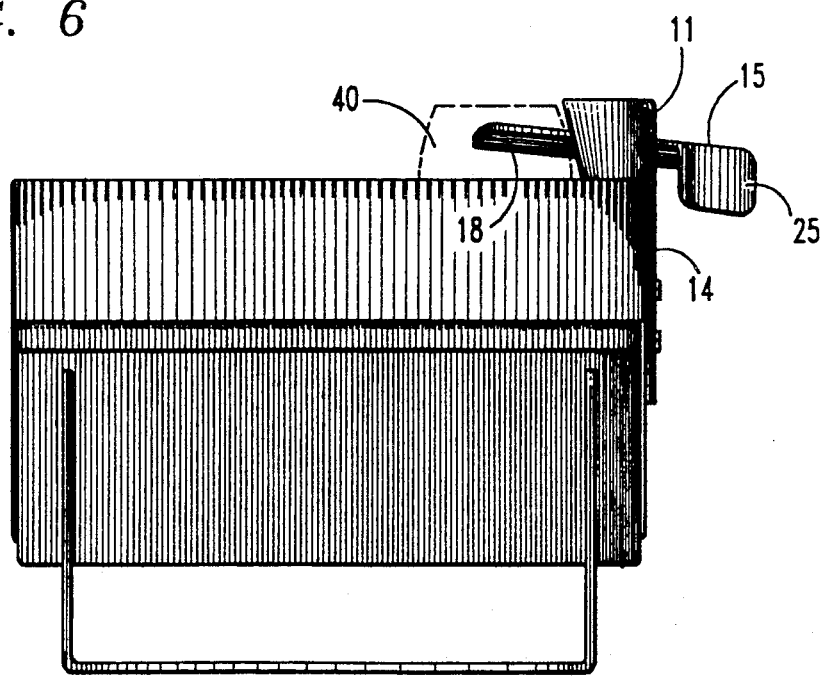
FIG. 6 shows a rear elevation view of the quick release latching mechanism attached to the enclosure and restraining the handset in accordance with the invention.
Figure 7:
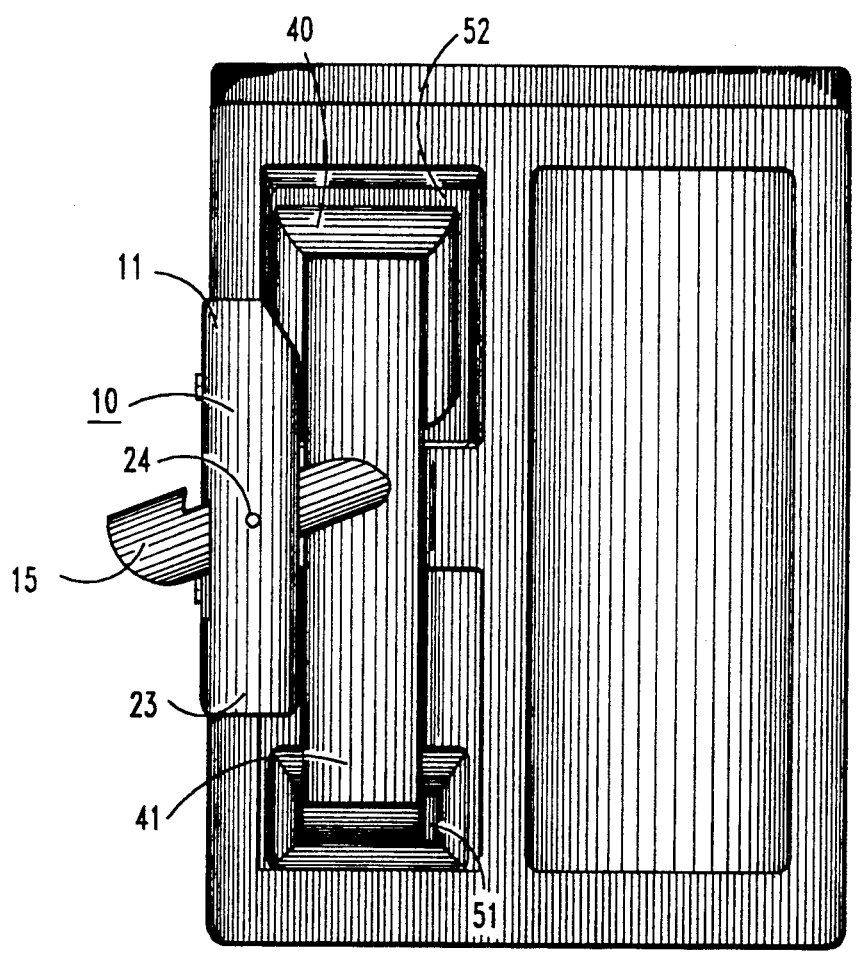
FIG. 7 shows a top plan view of the quick release latching mechanism attached to the enclosure and restraining the handset in accordance with the invention.
Figure 8:
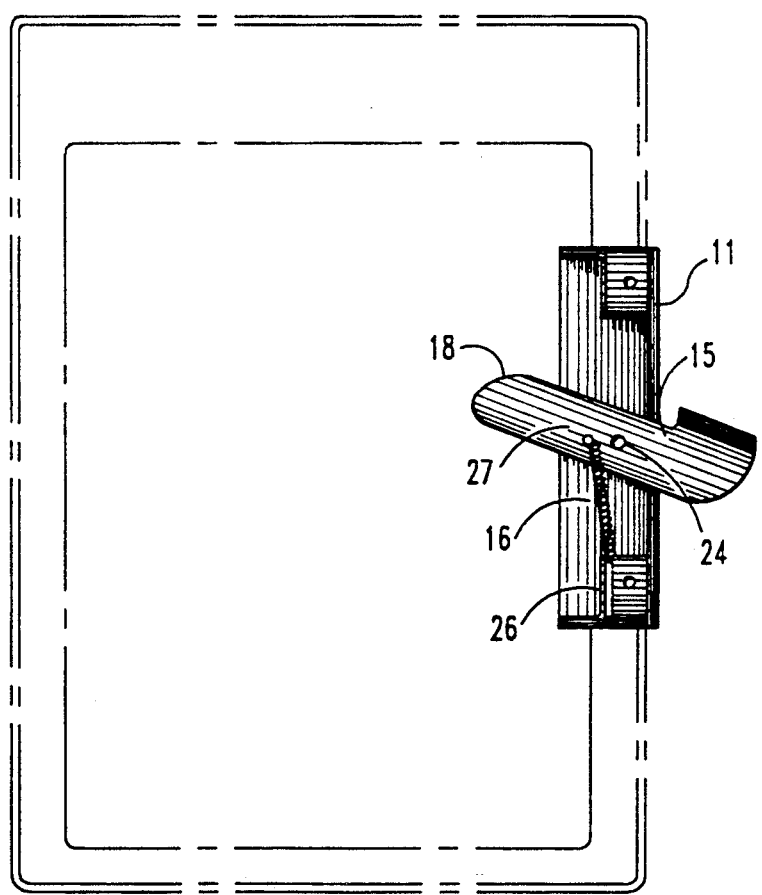
FIG. 8 shows a bottom plan view of the quick release latching mechanism attached to the enclosure in accordance with the invention.

With reference to FIGS. 1 through 9 in combination, a quick release latch mechanism 10 for a standard telephone handset 40 is shown in perspective view in FIG. 1 and includes a generally upstanding inverted L-shaped member 11 having an upstanding portion 14 and an outwardly extending portion 23. This L-shaped member is formed from sheet metal material such as stainless steel and attached to an enclosure 45 adapted for a standard telephone set base 50. Included in the structure of the inverted L-shaped member are sidewalls 12 and 13. Also affixed to this member 11 is a floating toggle type latch member 15. A coiled spring 16, more easily seen in FIGS. 2, 4 and 8, is connected to both the L-shaped member 11 and the latch member 15.

The enclosure 45 and the quick release latch mechanism 10 attached thereto are adaptable to any of the presently available telephone sets. The addition of the enclosure to a telephone set base does not interfere with the normal functioning of any of the buttons, switches or indicators. The base 50 is also attached to the enclosure by fasteners 46, such as screws, which advantageously permits the base to be reversed in the enclosure allowing the telephone set to be either wall or desk mounted. Since the quick release latch mechanism 10 and the enclosure 45 are not an integral part of the telephone set base 50, these components may be easily moved to new replacement telephone sets in case of telephone set failure. Thus repair and maintenance are also easily facilitated.

The floating toggle type latch member 15, like the L-shaped member 11, also is formed from sheet material such as stainless steel. This latch member 15 projects through an opening 17 in the L-shaped member 11 and has a generally planar surface 18, shown most clearly in FIGS. 6 and 8, which comprises the support surface of this latch member. This planar surface 18 extends outward and contacts or resides just above the rear surface 41 of the handset 40 when this handset is nested in the standard cavities 51 and 52. Contact between surfaces is also understood in the present context to mean that those surfaces are positioned in very close proximity to each other.

The cavities 51 and 52 comprise the cradle for the transmitter portion and the receiver portion of the handset 40 in the base 50. The latch member 15 provides support for the handset 40 in a direction orthogonal to the plane of the planar surface 18 and generally parallel to the height of the handset 40. In the present invention, the "height" of the handset should be understood to be the direction in which the handset projects out of the cradle when positioned therein. The surface walls of the cradle of the base 50 comprise support surfaces and provide support for the handset 40 in a direction generally orthogonal to the height of this handset. The cooperation of the support surface 18 of the latch member 15 along with the support surfaces of the cradle combine to secure ruggedly the handset 40 in the cradle when the telephone set is subjected to external shock forces. Any type of telephone handset that can accommodate the generally planar surface 18 of the latch member extending thereacross may be secured in a telephone set cradle in this manner. For protecting the rear surface of the handset from possible abrasion due to the sliding action of the latch member 15, the support surface 18 of latch member 15 or the rear surface 41 of the handset 40 may include a teflon coating, felt or other such material attached thereto.

Figure 9:
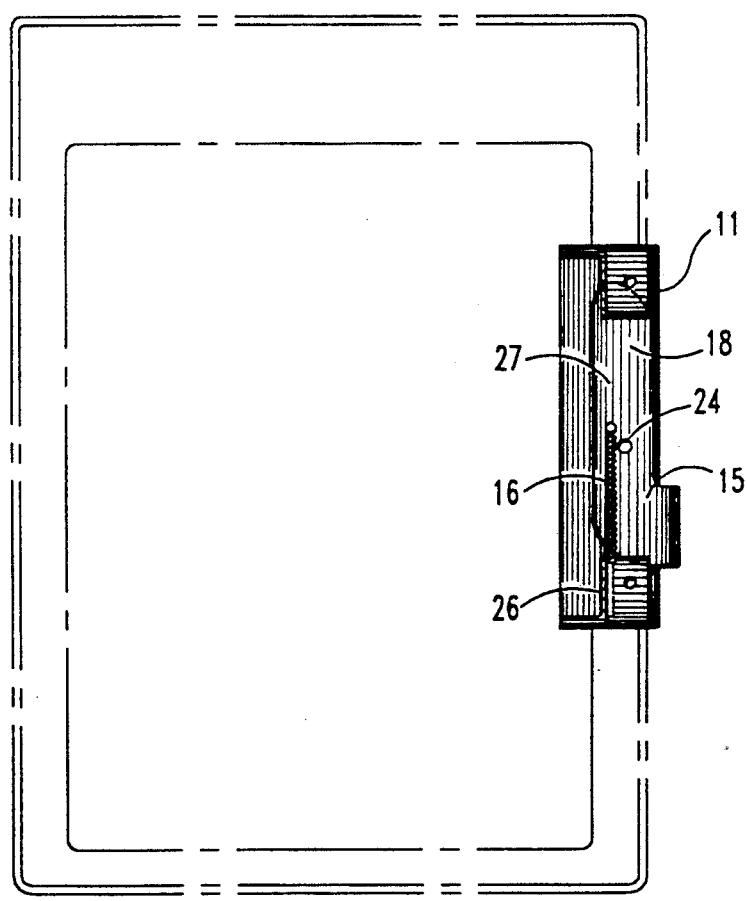
FIG. 9 shows a bottom plan view of the quick release latching mechanism attached to the enclosure, and also a latch member in the latching mechanism rotated to the open position for removing the handset in accordance with the invention.

The latch member 15 is positioned in spatial alignment with and secured to the outwardly extending portion 23 of the L-shaped member 11 via a single point fastener 24, such as a pin, rivet or other suitable single point connector, whereby rotational movement of the latch member 15 with respect to the L-shaped member 11 is facilitated. The latch member 15 includes a deflector tab portion 25 on a lateral extension thereof for rotating the latched member into an essentially retracted or open position below the outwardly extending portion 23 of the L-shaped member 11, as shown in FIG. 9, thereby permitting removal of the handset 40 from the cradle. This deflector tab portion 25 is inclined perpendicular to the plane of the support surface and located along a portion of one edge of the latch member extending in a direction opposite to that portion of the latch member providing the support surface for the handset 40. When released, this latch member 15 is forced to rotate by the tension in the coiled spring 16 through a prescribed arc to its normal closed position whereby it extends outwardly over the rear surface 41 of the handset 40.

This deflector tab portion 25 of the latch member 15 facilitates the easy removal of the handset 40 from the cradle of the base 50. To remove the handset 40 from the quick release latch mechanism, a user simply depresses the deflector tab portion 25 of the latch member 15 with, for example, the thumb of the right hand while lifting the handset 40 with the fingers of this hand. To hang up the handset 40, the user aligns the handset with the cradle and slightly back from the quick release mechanism 10. In this position, the receiver portion of the handset 40 is located in the vicinity of and to the right of the latch mechanism 10. The user then moves the handset 40 toward and into contact with the edge 28 of latch member 15. This causes the latch member 15 to rotate to the open position shown in FIG. 9 and allows the handset 40 to drop into place in the cradle of the base 50. As the handset 40 settles into the cradle, the latch member 15 is returned by the coil spring 16 to its normal latched or closed position.

The latching mechanism is of simplified and reliable construction with the latch member 15 comprising the only moving part. This latch member 15 is balanced around its pivot point, the single point fastener 24 attaching it to the parallel disposed and outwardly extending portion 23 of the L-shaped member 11. The coil spring 16 only provides the desired rotational force to the latch member 15 to return it to the closed position. This coil spring 16 need not be heavy duty in design since it has to provide only enough tension to return the latch member to its closed position. One end of the spring 16 is attached to the sidewall 12 by a pin 26 inserted therein. The other end of this spring is attached to the latch member 15 by a pin 27 positioned slightly offset from the pivot point of this latch member. The coiled spring 16 thus biases the latch member 15 such that this latch always returns to its closed position. Since the latch member 15 is balanced, i.e., equally proportioned in mass about its pivot point, the force provided by the spring 16 will not be affected by any external shock forces in a direction which press the rear surface 41 of the handset 40 against the support surface 18 provided by the latch member 15. These external shock forces can not cause the spring 16 to release since they are applied directly to the latch member 15 in a direction normal to the force exerted by the spring 16. And the sidewalls of the transmitter and receiver cavities in the base 50 secure the handset 40 against movement in a direction parallel to the plane of the support surface 18 provided by the latch member 15.

Figure 10:
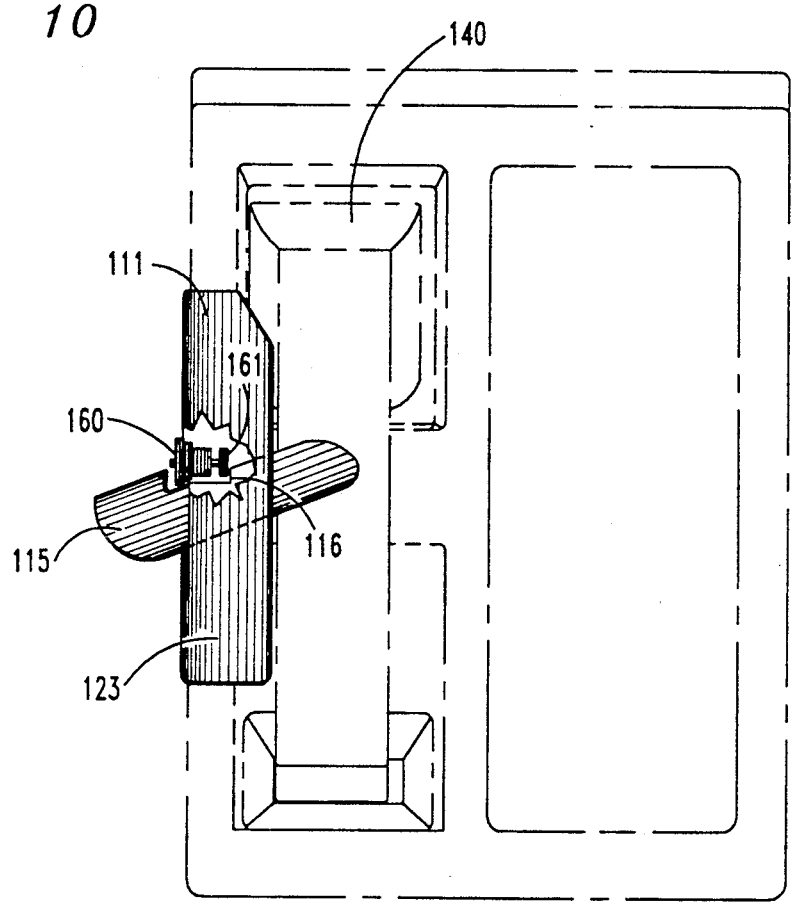
FIG. 10 shows a top plan view of a handset being restrained in a telephone base by a quick release latching mechanism adapted to include a locking arrangement in accordance with the invention.
Figure 11:
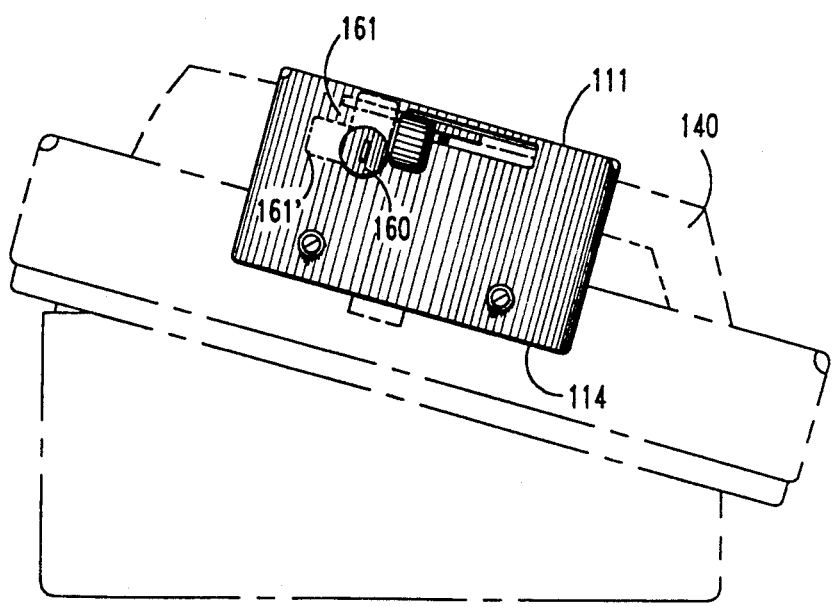
FIG. 11 shows a left side elevation view of the quick release latching mechanism shown in FIG. 10, the latching mechanism being attached to the enclosure and restraining the handset in accordance with the invention.

Referring next to FIGS. 10 and 11 in combination, there is shown a alternative embodiment of the quick release latch mechanism shown in FIG. 1. This alternative embodiment is the quick release mechanism of FIG. 1 modified to include a locking arrangement for the latch mechanism. This additional feature for the latching mechanism, in accordance with the invention, advantageously enables the handset 140 to be locked in place thereby preventing theft or unauthorized use of the telephone set when unattended. The fastening of the set to a desk or wall prevents the theft of the entire telephone set.

The latch mechanism is secured in the closed position by, for example, a barrel lock 160 which mounts in the side of the upstanding portion 114 of a generally upstanding inverted L-shaped member 111. The barrel lock 160 includes a projecting tab 161 affixed to one end for rotating between an upstanding and a laid-over position in accordance with the locking and unlocking of the barrel lock. A floating toggle type latch member 115 is affixed to member 111 and includes a notched surface 116 that is engaged by the projecting tab 161 when the tab is rotated to the upstanding position. This secures the latch member 115 in the closed position and thereby prevents the removal of the handset 140. When the tab 161 is rotated 90 degrees to the laid-over position, as illustratively represented by tab 161', the latch member 115 is then free to rotate between its closed and open position permitting removal and replacement of the handset 140.

Although the quick release latch mechanism has been described in the context of securing a telephone handset, it is to be understood that this type of latch mechanism is also suitable for use with other devices for enabling these devices to satisfy environmental and security requirements. Thus, although not directly described herein, such other uses of this invention are also contemplated and may obviously be resorted to by those skilled in the art without departing from the spirit and scope of the invention as hereinafter defined by the appended claims.

I claim:

1. A latching mechanism for restraining a telephone handset in a handset cradle, the mechanism comprising:
    a floating toggle type latch member having a support surface for positioning in contact with the telephone handset;
    a support member for the latch member, the support member comprising a generally upstanding inverted L-shaped member having an upstanding portion and an outwardly extending portion, the latch member being spatially aligned with the outwardly extending portion of the support member and connected at a single point to said outwardly extending portion of the support member for permitting rotation of the latch member; and
    a spring member connected to both the latch member and the support member for rotating the latch member to a closed position, the support surface of the latch member being positioned in contact with the telephone handset in said closed position and restraining the handset in the handset cradle.

2. The latching mechanism of claim 1 wherein the support surface of the latch member is a generally planar support surface, the support surface restraining the handset in a direction generally parallel to the height of the handset.

3. The latching mechanism of claim 2 wherein the generally planar surface of the latch member is arranged for contacting a rear surface of the handset when the latch member is positioned over the handset in the closed position.

4. The latching mechanism of claim 3 wherein the handset cradle restrains the handset in a direction generally orthogonal to the height of the handset, the interaction between the handset cradle and the latch member providing the total restraint for the telephone handset.

5. The latching mechanism of claim 1 wherein the latch member is equally proportioned in mass about the single point connecting said latch member to the support member.

6. The latching mechanism of claim 5 wherein the spring member comprises a coil spring connected to the latch member and the support member, the coil spring being connected to the latch member in a position offset from the single point connecting the latch member to the support member.

7. The latching mechanism of claim 6 wherein the generally upstanding inverted L-shaped member further includes a pair of sidewalls.

8. The latching mechanism of claim 7 further comprising locking means for preventing removal of the handset from the handset cradle.

9. The latching mechanism of claim 8 wherein the locking means comprises a projecting tab affixed to a locking member attached to the upstanding portion of the L-shaped member, the projecting tab being rotatable to a position for engaging a notch on the latch member when the latch member is in the closed position.

10. The latching mechanism of claim 7 wherein the support member further includes an opening for accommodating a lateral extension of the latch member.

11. The latching mechanism of claim 10 wherein the telephone handset is a conventional handset having a surface for accommodating the generally planar support surface of the latch member.

12. The latching mechanism of claim 11 wherein the handset cradle is located in the base of a telephone set.

13. A method of restraining a telephone handset in a handset cradle, the method comprising the steps of:
providing a floating toggle type latch member having a support surface for positioning in contact with the telephone handset;
providing a support member for the latch member, the support member comprising a generally upstanding inverted L-shaped member having an upstanding portion and an outwardly extending portion, the latch member being spatially aligned with the outwardly extending portion and connected to said outwardly extending portion at a single point for permitting rotation of the latch member; and
providing a spring member connected to both the latch member and the support member for rotating the latch member to a closed position, the support surface of the latch member being positioned in contact with the telephone handset in said closed position and restraining the handset in the handset cradle.

14. The method of restraining a telephone handset as in claim 13 wherein the support surface of the latch member is a generally planar support surface, the support surface restraining the handset in a direction generally parallel to the height of the handset.

15. The method of restraining a telephone handset as in claim 14 further comprising the step of arranging the generally planar surface of the latch member to contact a rear surface of the handset when the latch member is positioned over the handset in the closed position.

16. The method of restraining a telephone handset as in claim 15 wherein the handset cradle restrains the handset in a direction generally orthogonal to the height of the handset, the interaction between the handset cradle and the latch member providing the total restraint for the telephone handset.

17. The method of restraining a telephone handset as in claim 13 further including the step of equally proportioning the latch member in mass about the single point connecting said latch member to the support member.

18. The method of restraining a telephone handset as in claim 17 wherein the spring member further comprises a coil spring connected to the latch member and the support member, the coil spring being connected to the latch member in a position offset from the single point connecting the latch member to the support member.

19. The method of restraining a telephone handset as in claim 18 wherein the generally upstanding inverted L-shaped member further includes a pair of sidewalls.

20. The method of restraining a telephone handset as in claim 19 further comprising the step of providing a locking member for preventing removal of the handset from the handset cradle.

21. The method of restraining a telephone handset as in claim 20 wherein the locking member includes a projecting tab affixed thereto for rotating to a position for engaging a notch on the latch member when the latch member is in the closed position, the locking member being attached to the upstanding portion of the L-shaped member.

22. The method of restraining a telephone handset as in claim 19 wherein the support member further includes an opening for accommodating a lateral extension of the latch member.

23. The method of restraining a telephone handset as in claim 22 wherein the telephone handset is a conventional handset having a surface for accommodating the generally planar support surface of the latch member.

24. The method of restraining a telephone handset as in claim 23 wherein the handset cradle is located in the base of a telephone set.

25. A latching mechanism for restraining a telephone handset in a handset cradle, the mechanism comprising:
a floating toggle type latch member having a support surface for positioning in contact with the telephone handset;
a support member for the latch member, the support member and the latch member being spatially aligned and connected at a single point for permitting rotation of the latch member, and the latch member being equally proportioned in mass about said single point; and
a spring member connected to both the latch member and the support member for rotating the latch member to a closed position, the support surface of the latch member being positioned in contact with the telephone handset in said closed position and restraining the handset in the handset cradle.

* * * * *